United States Patent

Tajima et al.

Patent Number: 6,101,381
Date of Patent: *Aug. 8, 2000

[54] TELECOMMUNICATION SYSTEM, RADIO BASE STATION THEREOF, AND PORTABLE TELECOMMUNICATION TERMINAL THEREOF

[75] Inventors: Mie Tajima, Tokyo; Takehiro Sugita, Kanagawa; Junichi Nakata, Tokyo, all of Japan

[73] Assignee: Sony Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/819,661

[22] Filed: Mar. 17, 1997

[30] Foreign Application Priority Data

Mar. 21, 1996 [JP] Japan .................................. 08-091936

[51] Int. Cl.⁷ ..................................................... G08B 5/22
[52] U.S. Cl. ........................ 455/414; 455/517; 455/406; 455/566; 455/384; 340/825.44
[58] Field of Search ..................................... 455/517, 406, 455/413, 414, 88, 31.1–31.3, 32.1, 38.1–38.5, 566; 340/825.44

[56] References Cited

U.S. PATENT DOCUMENTS

| | | | |
|---|---|---|---|
| 5,448,759 | 9/1995 | Krebs et al. ........................... | 455/517 |
| 5,517,549 | 5/1996 | Lee ......................................... | 455/407 |
| 5,555,446 | 9/1996 | Jasinski ................................. | 455/54.2 |
| 5,670,950 | 9/1997 | Otsuka ............................... | 340/825.33 |
| 5,694,455 | 12/1997 | Goodman ................................. | 379/59 |
| 5,712,899 | 1/1998 | Pace ........................................ | 379/58 |
| 5,724,357 | 3/1998 | Derks ..................................... | 370/413 |
| 5,727,057 | 3/1998 | Emery et al. .......................... | 379/211 |
| 5,752,185 | 5/1998 | Ahuja ..................................... | 455/414 |
| 5,812,945 | 9/1998 | Hansen et al. .......................... | 455/407 |
| 5,838,252 | 11/1998 | Kikinis ................................... | 455/575 |
| 5,870,030 | 2/1999 | DeLuca et al. ..................... | 340/825.44 |

FOREIGN PATENT DOCUMENTS

| | | |
|---|---|---|
| 9301665 | 1/1993 | WIPO . |
| 9411967 | 5/1994 | WIPO . |

Primary Examiner—Reinhard J. Eisenzopf
Assistant Examiner—Duc Nguyen
Attorney, Agent, or Firm—Jay H. Maioli

[57] ABSTRACT

In a telecommunication system a service area is divided into a plurality of cells. Radio base stations are disposed corresponding to individual cells of the plurality of cells. Each radio base station stores regional information such as disaster information, advertisement information, and shopping information. When a communication is made between a radio base station and a portable telephone terminal, regional information such as disaster information, advertisement information, and shopping information is transmitted from the base station to the portable telephone terminal.

8 Claims, 12 Drawing Sheets

Do you buy "ABC"?

1. YES
2. NO

TELECOMMUNICATION SYSTEM, RADIO BASE STATION THEREOF, AND PORTABLE TELECOMMUNICATION TERMINAL THEREOF

BACKGROUND OF THE INVENTION

1. Field of the Invention

The present invention relates to a telecommunication system for providing a user of a portable telephone terminal with regional information, a radio base station thereof, and a portable telecommunication terminal thereof.

2. Description of the Related Art

A service system that promptly provides people with regional information that is closely related to the region where they live is desired. For example, when a disaster such as a fire or an earthquake takes place, if people can obtain information about the disaster, they can flee to safe places and/or take proper actions. As another example, when a short-term bargain sale is held in a regional shopping center, if people have the information of the sale in advance, they can buy cheap bargain items. Conventionally, such regional information is provided through advertisement in newspapers, television programs, radio programs, and so forth. However, newspapers and flyers cannot provide regional information on real time basis. On the other hand, since the service areas of TV broadcasts and radio broadcasts are wide, they are not pertinent to provide audiences with regional information.

Thus, so far, a service system that promptly provides people with regional information has not been present. However, in recent years, portable telephone terminals have been become common for ordinal people. Although portable telephone terminals are used for only voice communications, they can be treated as information terminals Thus, the users of the portable telephone terminals can be provided with regional information. In this case, new investment is not required. In addition, since portable telephone terminals are small and light, the users can obtain information anywhere and anytime. If advertisement of stores is placed through portable telephone terminals, the advertisement fees will cause the communication fees of the portable telephone terminals to decrease.

OBJECTS AND SUMMARY OF THE INVENTION

Therefore, an object of the present invention is to provide a telecommunication system that provides users with regional information, a radio base station thereof, and a portable information terminal.

The present invention is a telecommunication system, comprising a plurality of radio base stations each disposed in one of a plurality of cells which are formed by dividing a service area of telecommunication, and a plurality of portable radio telecommunication units each positioned in one of the cells and performing telecommunication via the radio base station disposed in one of the cells, wherein, in at least one of the cells, the radio telecommunication unit transmits identification information during origination of a call, and the radio base station transmits predetermined information to the portable radio telecommunication unit when the identification information is predetermined identification information.

In a cellular system, radio base stations are disposed at intervals of several kilometers. In each radio base station, regional information such as disaster information, advertisement information, and shopping information is stored as audio information. When a portable telecommunication terminal communicates with a radio base station, it transmits such information to the portable telecommunication terminal. In the cellular system, since radio base stations are disposed at intervals of several kilometers, each cell can be treated as a regional unit that provides regional information. When regional information is stored in each radio base station, users can promptly obtain such information.

These and other objects, features and advantages of the present invention will become more apparent in light of the following detailed description of best mode embodiments thereof, as illustrated in the accompanying drawings.

DETAILED DESCRIPTION OF THE PREFERRED EMBODIMENTS

Next, with reference to the accompanying drawings, embodiments of the present invention will be described. According to the present invention, a cellular type portable telephone system provides the users with regional information. In the cellular type portable telephone system, radio base stations are disposed at intervals of several kilometers. Portable telephone terminals communicate with the radio base stations. An area in which portable telephone terminals can communicate with each radio base station is referred to as a cell. To effectively use an assigned frequency channel, the radius of each cell is several kilometers.

In the cellular portable telephone system, radio base stations are disposed at intervals of several kilometers. Each radio base station covers a relevant cell. Each cell has an area suitably treated as a regional unit that provides regional information such as disaster information (for example, a fire), civic information, advertisement information, and shopping information.

In the system according to the present invention, regional information is stored in each radio base station. When required, the regional information stored in the radio base station is transmitted to portable telephone terminals.

Figure 1:
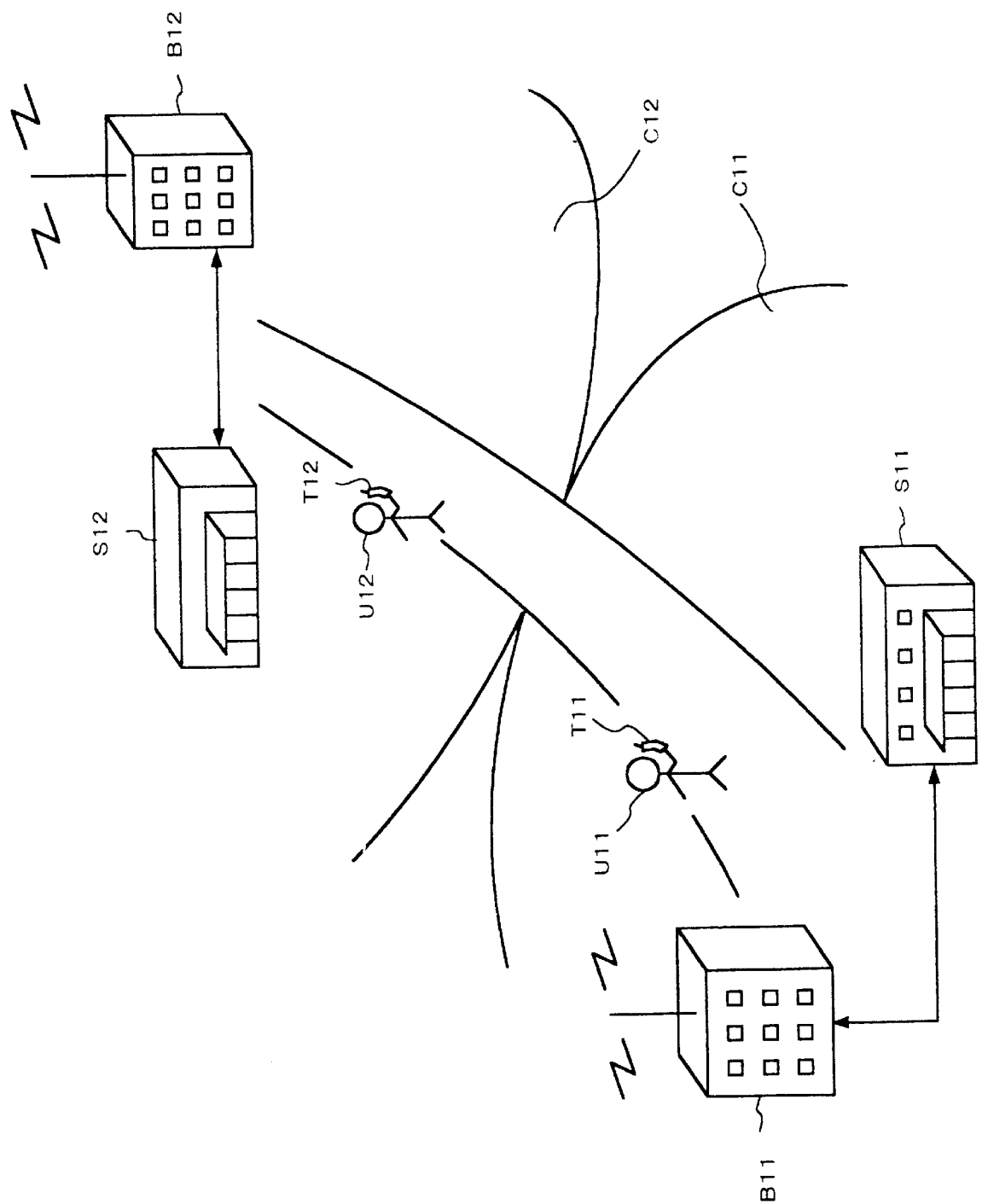
FIG. 1 is a schematic diagram showing the overall structure of a system according to the present invention.

FIG. 1 is a schematic diagram showing an example of the structure of a system according to the present invention. In FIG. 1, B11, B12, and so forth are radio base stations. C11, C12, and so forth are cells joining as service areas of the radio base stations B11, B12, and so forth. The radio base stations B11, B12, and so forth are disposed at intervals of several kilometers. The cells C11, C12, and so forth are used as regional units that provide regional information. In other words, information providers S11, S12, and so forth of the cells C11, C12, and so forth provide the radio base stations B11, B12, and so forth with required information as audio information. Real examples of the information providers S11, S12, and so forth are a fire station, a disaster prevention center (to which disaster information is promptly transmitted), a civic center (that provides citizens with regional information), and regional stores (that want to provide their prospects with advertisement and shopping information). In addition to disaster information, citizen service information, advertisement information, and shopping information, various types of information such as recruit information and traffic information can be transmitted.

When portable telephone terminals T11, T12, and so forth of users U11, U12, and so forth originate calls, communications are made between the portable telephone terminals T11, T12, and so forth and the radio base stations B11, B12, and so forth, respectively. At this point, regional information is transmitted as audio information from the radio base stations B11, B12, and so forth to the portable telephone terminals T11, T12, and so forth of the users U11, U12, and so forth.

When a fire take place in the cell C11, the information thereof is promptly transmitted from a fire station and/or a disaster prevention center to the radio base station B11. When the user U11 of the portable telephone terminal T11 in the cell C11 originates a call, the information of the fire is transmitted from the radio base station B11, to the portable telephone terminal T11. Thus, the portable telephone terminal T11 outputs audio information such as "A fire took place at A Street B. Flee to the place ABC." Thus, the user can accurately and promptly know the place, scale, and escape route of the fire.

Assuming that a store in the cell C12 is holding a bargain sale and that the advertisement information is stored in the radio base station B12, when the user U12 of the portable telephone terminal T12 in the cell C12 originates a call, the advertisement information is transmitted from the radio base station B12 to the portable telephone terminal T12. Thus, the portable telephone terminal T1 outputs audio information such as "A bargain sale at AB department store". Since the area of each cell is at most several kilometers, when a user hears the audio information, he or she can buy bargain items at the store.

When such advertisement information is transmitted, the advertisement fee can contribute to reducing the communication fee of the user. In other words, in such a system, whenever a user originates a call with his or her portable telephone terminal, it always outputs advertisement information. Thus, since the effect of the advertisement is very large, the advertisement income becomes huge. Consequently, when users of portable telephone terminals accept the receiving of advertisement information, the communication fees of these users can be reduced.

It should be noted that the information that is transmitted in the system is not limited to audio information. In addition, text and graphic information can be transmitted. Moreover, a reply of the information transmitted from a radio base station to a portable telephone terminal can be sent back to the radio base station.

Figure 2:
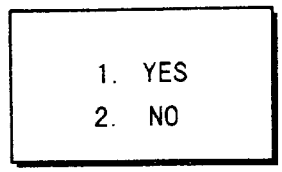
FIG. 2 is a schematic diagram for explaining an example of the system according to the present invention.

For example, in the case of shopping information, along with audio information as shopping information, text information for the purchase of commodities is transmitted from a radio base station to a portable telephone terminal. As shown in FIG. 2, information for the purchase of commodities is output to the display of the portable telephone terminal. When the user of the portable telephone terminal operates a proper key of the key pad, the reply information is transmitted to the radio base station. In the case shown in FIG. 2, when the user wants to purchase a commodity on the display, he or she presses the key "1". Otherwise, the user presses the key "2". Thereafter, when the user presses the key "#", the purchase information is acknowledged. Thus, the user can purchase the desired commodity on real time basis.

In the above-described example, one cell of the cellular type portable telephone system is treated as a regional unit that provides the users with regional information. However, it should be noted that the relation between a cell and a regional unit that provides users with regional information is not limited. In other words, particular information can be stored in radio base stations of a plurality of cells. In the above-described example, the system deals with cellular type portable telephone terminals. However, the present invention can be applied for other systems. In the case of PHS (Personal Handyphone System), since the service area of each cell is narrow, a plurality of radio base stations that can cover several kilometers is treated as one regional unit.

Figure 3:
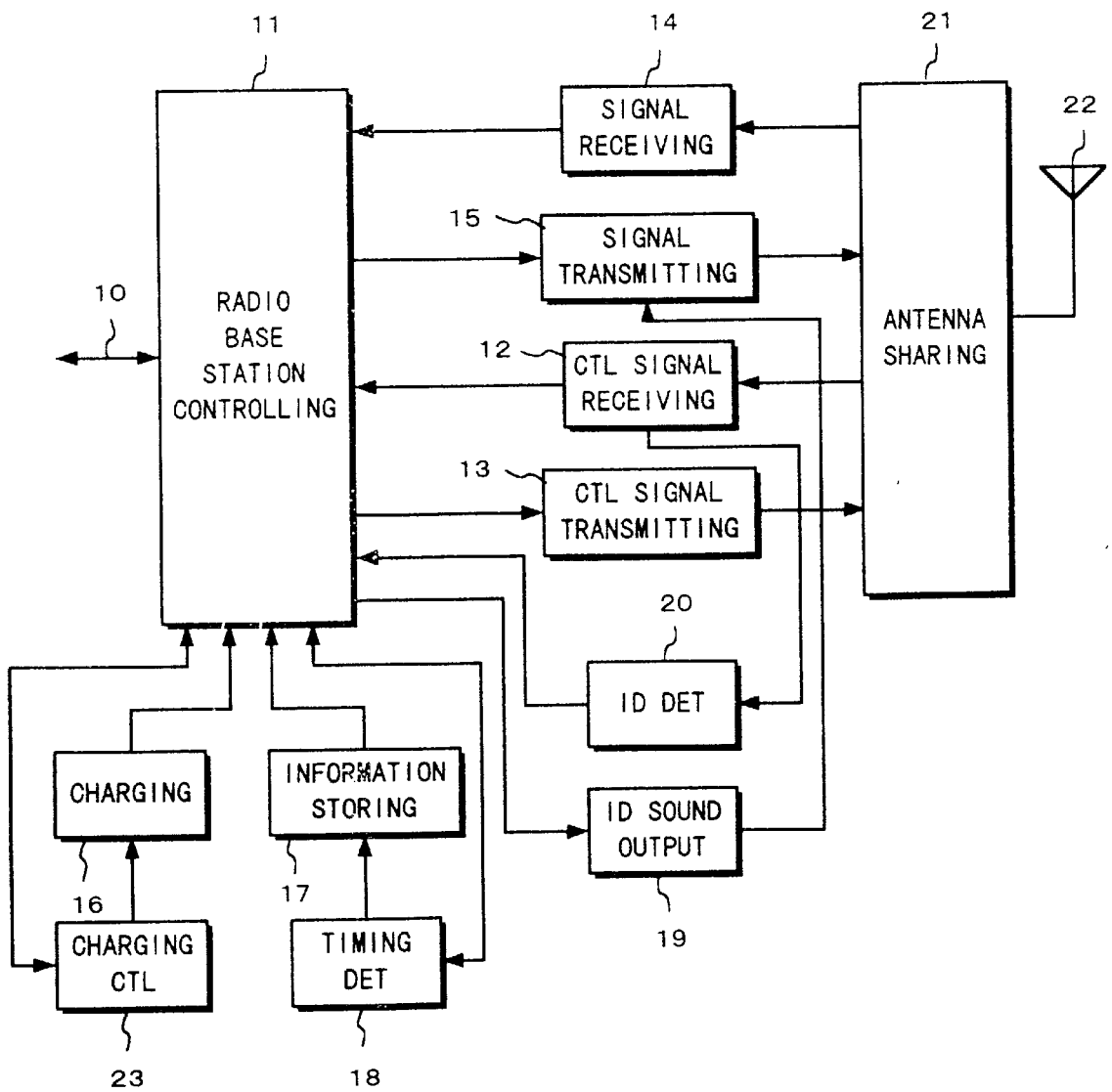
FIG. 3 is a block diagram showing an example of a radio base station of the system according to the present invention.

FIG. 3 shows an example of the structure of a radio base station of the system according to the present invention. The radio base station comprises a radio base station controlling portion 11, a control signal receiving portion 12, a control signal transmitting portion 13, an audio signal receiving portion 14, an audio signal transmitting portion 15, and a charging portion 16. The radio base station controlling portion 11 controls the entire radio base station. The control signal receiving portion 12 and the control signal transmitting portion 13 communicate with a portable telephone terminal using a control signal channel. The audio signal receiving portion 14 and the audio signal transmitting portion 15 communicate with a portable telephone terminal using an audio signal channel. The charging portion 16 obtains a communication fee of the portable telephone terminal. In the system according to the present invention, a storing portion 17 is disposed so as to store audio information such as disaster information, citizen information, purchase information, advertisement information, and shopping information. In addition, a timing determining portion 18 that sets the transmission start time and the transmission end time of information stored in the storing portion 17 is disposed. Moreover, an ID sound outputting portion 19 is disposed so as to notify a portable telephone terminal of the completion of the transmission of the information. The radio base station also has an ID number determining portion 20 that identifies whether or not the portable telephone terminal can accept the receiving of such information.

The radio base station controlling portion 11 is connected to a public telephone line through a line 10 and a control station (not shown). The control signal receiving portion 12 and the control signal transmitting portion 13 communicate with a portable telephone terminal using a control signal channel under the control of the radio base station controlling portion 11. The control signal transmitting portion 13 generates a control signal under the control of the radio base station controlling portion 11. The control signal is transmitted from an antenna 22 through a antenna sharing unit 21. The receive signal of the control signal channel received from the antenna 22 is supplied to the control signal receiving portion 12 through the antenna sharing unit 21. An output signal of the control signal receiving portion 12 is supplied to the radio base station controlling portion 11.

The audio signal receiving portion 14 and the audio signal transmitting portion 15 communicate with a portable telephone terminal using an audio signal channel under the control of the radio base station controlling portion 11. An audio signal received through the line 10 is supplied to the audio signal transmitting portion 15 under the control of the radio base station controlling portion 11. The audio signal transmitting portion 15 modulates the audio signal. An output signal of the audio signal transmitting portion 15 is transmitted from the antenna 22 through the antenna sharing unit 21. A receive signal of the audio signal channel received from the antenna 22 is supplied to the audio signal receiving portion 14 through the antenna sharing unit 21. The audio signal receiving portion 14 demodulates the audio signal. The audio signal received from the audio signal receiving portion 14 is transmitted through the line 10 under the control of the radio base station controlling portion 11.

As described above, the storing portion 17 stores regional information such as disaster information, citizen information, shopping information, and advertisement information as audio information. The storing portion 17 is for example a semiconductor memory, an optical-magnetic disc, or a magnetic tape. Information stored in the storing portion 17 may be in an analog format or a digital format.

In the case that audio information is output from the storing portion 17, an ID number of a portable telephone terminal is transmitted to the radio base station. The ID number is received by the control signal receiving portion 12 and supplied to the ID number determining portion 20. The ID number determining portion 20 determines whether or not the portable telephone terminal can accept the receiving of such information corresponding to the received ID number.

An output signal of the ID number determining portion 20 is supplied to the radio base station controlling portion 11. When the ID number determining portion 20 has determined that the portable telephone terminal can accept the receiving of the information corresponding to the output signal of the radio base station controlling portion 11, the audio information stored in the storing portion 17 can be transmitted to the portable telephone terminal. Corresponding to the transmission start time set by the timing determining portion 18, the information stored in the storing portion 17 is transmitted. The information that is output from the storing portion 17 is transmitted to the audio signal transmitting portion 15 under the control of the radio base station controlling portion 11. The audio signal transmitting portion 15 modulates the information. An output signal of the audio signal transmitting portion 15 is transmitted from the antenna 22 through the antenna sharing unit 21. After the audio information has been completely transmitted, the ID sound output portion 19 generates an ID sound signal. The ID sound signal is supplied to the audio signal transmitting portion 15 and then transmitted from the antenna 22.

Figure 4:
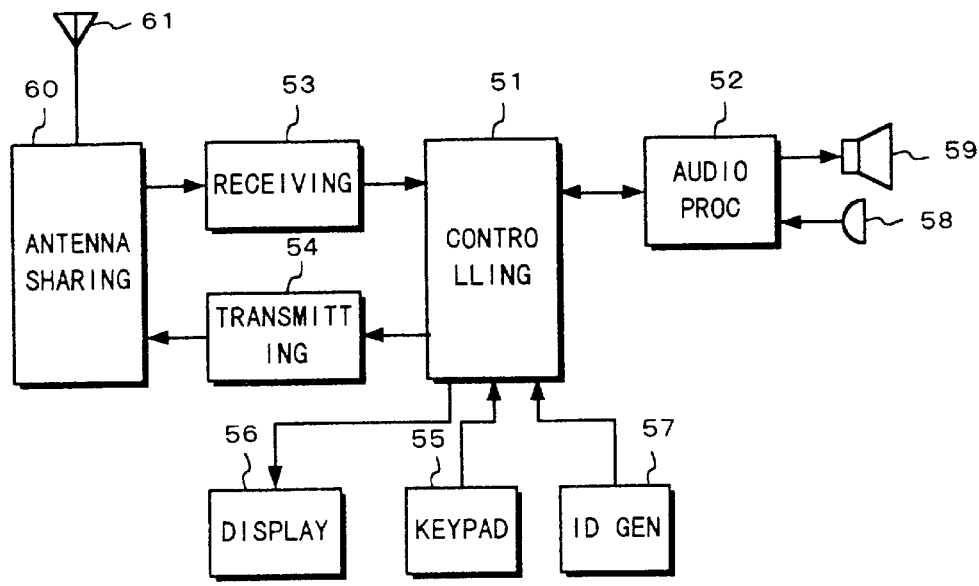
FIG. 4 is a block diagram showing a portable telephone terminal of the system according to the present invention.

FIG. 4 shows an example of the structure of a portable telephone terminal. The portable telephone terminal comprises a controlling circuit 51, an audio signal processing circuit 52, a receiving circuit 53, and a transmitting circuit 54. The controlling circuit 51 controls the entire portable telephone terminal. The audio signal processing circuit 52 processes an audio signal. The receiving circuit 53 receives a signal from the radio base station. The transmitting circuit 54 transmits a signal to the radio base station. The audio signal processing circuit 52 has a microphone 58 and a speaker 59. An input signal is supplied from a key pad 55 to the controlling circuit 51. An output signal of the controlling circuit 51 is supplied to a display 56. The display 56 outputs a mode setup state, an input telephone number, and so forth. In association with the controlling circuit 51, an ID number generating circuit 57 is disposed. The ID number generating circuit 57 generates an ID number that represents whether or not the portable telephone terminal can accept the receiving of such information.

When the user originates a call with his or her portable telephone terminal, an audio signal is supplied from the microphone 58 to the audio signal processing circuit 52. An output signal of the audio signal processing circuit 52 is supplied to the transmitting circuit 54 under the control of the controlling circuit 51. The transmitting circuit 54 modulates the audio signal. An output signal of the transmitting circuit 54 is supplied to an antenna 61 through an antenna sharing unit 60. A receive signal of the antenna 61 is supplied to the receiving circuit 53 through the antenna sharing unit 60. The receiving circuit 53 demodulates the audio signal. An output signal of the receiving circuit 53 is supplied to the audio signal processing circuit 52 under the control of the controlling circuit 51. An output signal of the audio signal processing circuit 52 is supplied to the speaker 59.

Figure 5:
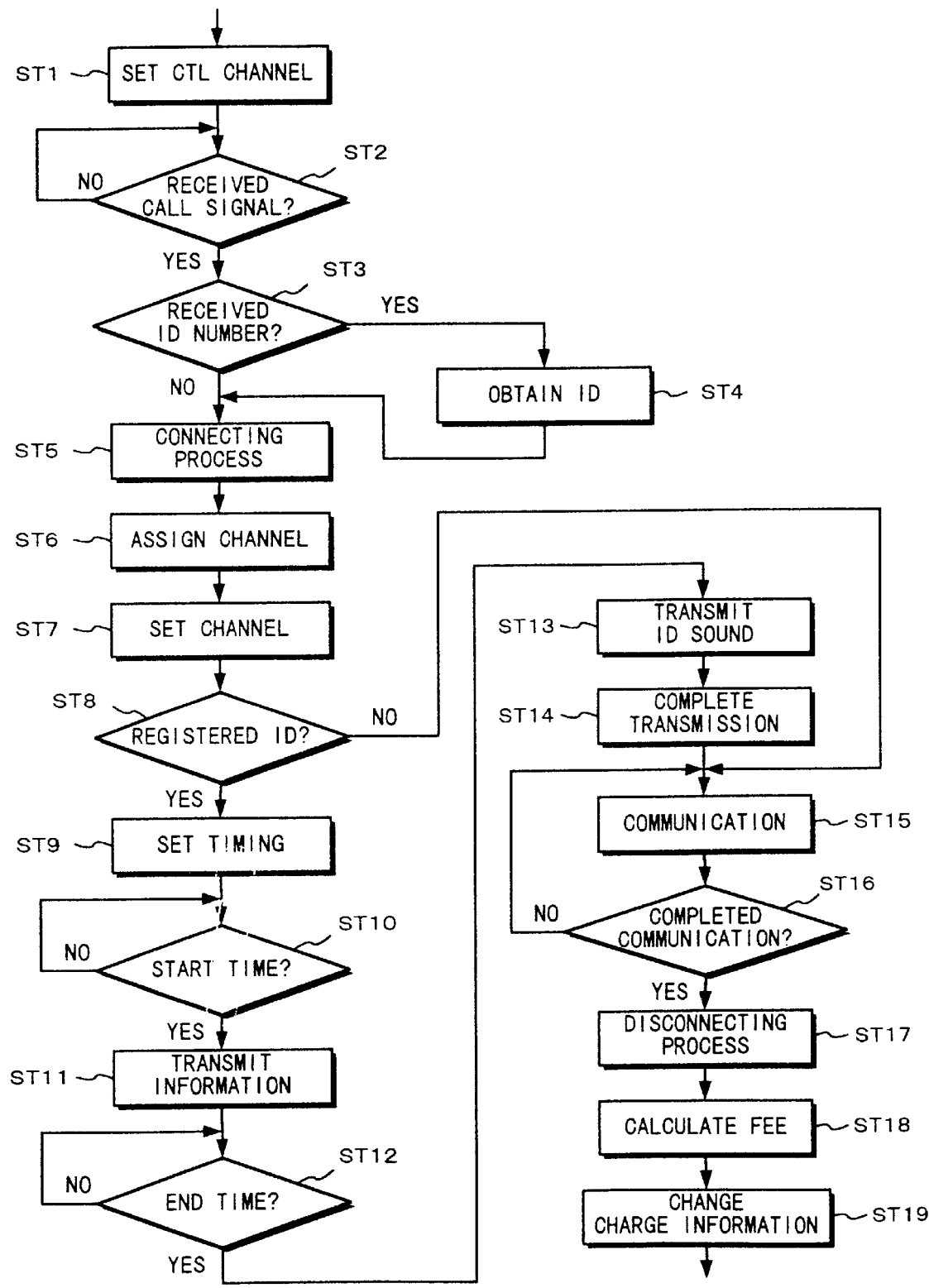
FIG. 5 is a flow chart for explaining the radio base station of the system according to the present invention.

FIG. 5 is a flow chart showing the operation of the radio base station shown in FIG. 3. The radio base station sets a control signal channel (at step ST1). Thereafter, the radio base station determines whether or not a call origination signal has been received on the control signal channel (at step ST2). When the determined result at step ST2 is YES, the base station determines whether or not an ID number has been received (at step ST3). When the determined result at step ST3 is YES, the radio base station obtains the ID number (at step ST4). Thereafter, the radio base station performs a connecting process (at step ST5). When the determined result at step ST3 is NO, the flow advances to step ST5. At step ST5, the radio base station performs the connecting process. After the radio base station has completed the connecting process, it transmits a signal that represents an audio signal channel to the portable telephone terminal (at step ST6). Thus, the radio base station sets the audio signal channel (at step ST7). The ID number determining portion 20 determines whether or not the received ID number accords with an ID number that has been registered (at step ST8).

When the determined result at step ST8 is YES, the radio base station causes the timing determining portion 18 to set the transmission start time and the transmission end time of the information (at step ST9). The timing determining portion 18 determines whether or not the transmission start time of the information took place (at step ST10). When the determined result at step ST10 is YES, the radio base station transmits the information stored in the storing portion 17 (at step ST11). In other words, the information that is output from the storing portion 17 is modulated by the audio signal transmitting portion 15 and then transmitted from the antenna 22 through the antenna sharing unit 21. Thereafter, the timing determining portion 18 determines whether or not the transmission end time of the information took place (at step ST12). When the determined result at step ST12 is YES, the ID sound output portion 19 transmits an ID sound (at step ST13). Thus, the radio base station completes the transmission of the information (at step ST14). Thereafter, a normal communication process is performed between the radio base station and the portable telephone terminal (at step ST15). Thereafter, the radio base station determines whether or not the communication has been completed (at step ST16). When the determined result at step ST16 is YES, the radio base station performs a disconnecting process (at step ST17).

When the determined result at step ST8 is NO, the flow advances to step ST15. At step ST15, the radio base station does not transmit the information. Instead, a normal communication is performed between the radio base station and the portable telephone terminal.

After the radio base station has completed the disconnecting process at step ST17, the charging portion 16 calculates the communication fee of the portable telephone terminal (at step ST18). Depending on whether or not the portable telephone terminal has received the information, the charging portion 16 changes charging information (at step ST19). When the information transmitted from the radio base station is advertisement information, the advertisement information affects the communication fee of the portable telephone terminal so that the communication fee is reduced.

Figure 6:
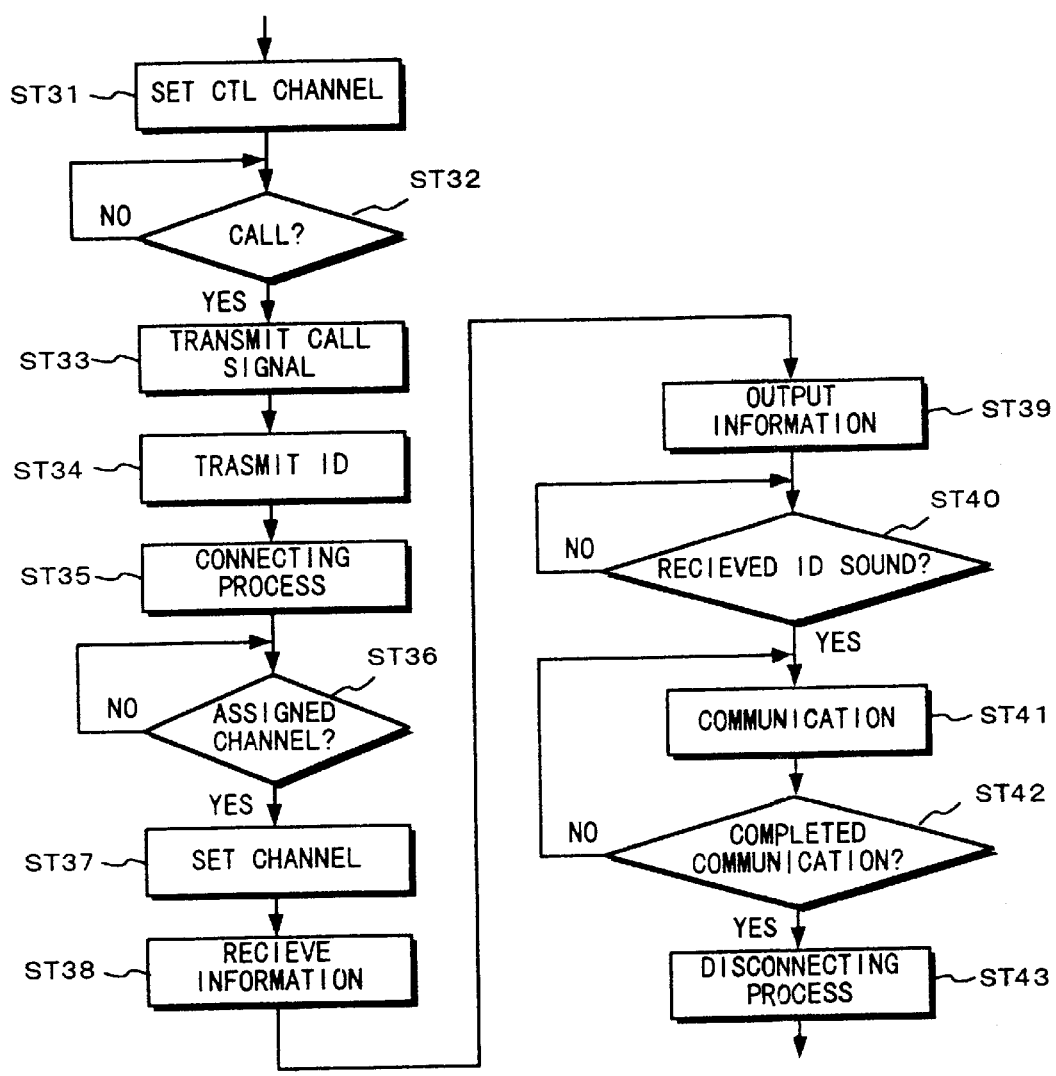
FIG. 6 is a flow chart for explaining the portable telephone terminal of the system according to the present invention.

FIG. 6 is a flow chart showing the operation of the portable telephone terminal shown in FIG. 4. In FIG. 6, when the portable telephone terminal is in the normal waiting state, it sets a control signal channel (at step ST31). The portable telephone terminal determines whether or not it has made a call (at step ST32). When the determined result at step ST32 is YES, the portable telephone terminal transmits a call origination signal (at step ST33). The portable telephone terminal transmits an ID number generated by the ID number generating portion 57 (at step ST34). The ID number generating portion 57 has stored a unique ID number. In other words, when the information service is available with the portable telephone terminal, the ID number has been registered. Thereafter, the portable telephone terminal performs a connecting process (at step ST35). After the portable telephone terminal has completed the connecting process, it receives a signal that represents an audio signal channel from the radio base station. The portable telephone terminal determines whether or not the audio signal channel has been assigned (at step ST36). When the determined result at step ST36 is YES, the portable telephone terminal sets the audio signal channel (at step ST37).

When the portable telephone terminal has set the audio signal channel, the radio base station transmits regional information as audio information to the portable telephone terminal. The portable telephone terminal receives the information (at step ST38). The audio signal processing circuit 52 generates an audio signal with the received information and outputs the audio signal from the speaker 59 (at step ST39). The portable telephone terminal determines whether or not an ID sound has been received (at step ST40). After the radio base station has completely transmitted the information, it transmits a signal that represents an ID sound to the portable telephone terminal. After the portable telephone terminal has received the signal of the ID sound, a normal communication is performed between the radio base station and the portable telephone terminal (at step ST41). Thereafter, the portable telephone terminal determines whether or not the communication has been completed (at step ST42). When the determined result at step ST42 is YES, the portable telephone terminal performs a disconnecting process (at step ST43).

Figure 7:
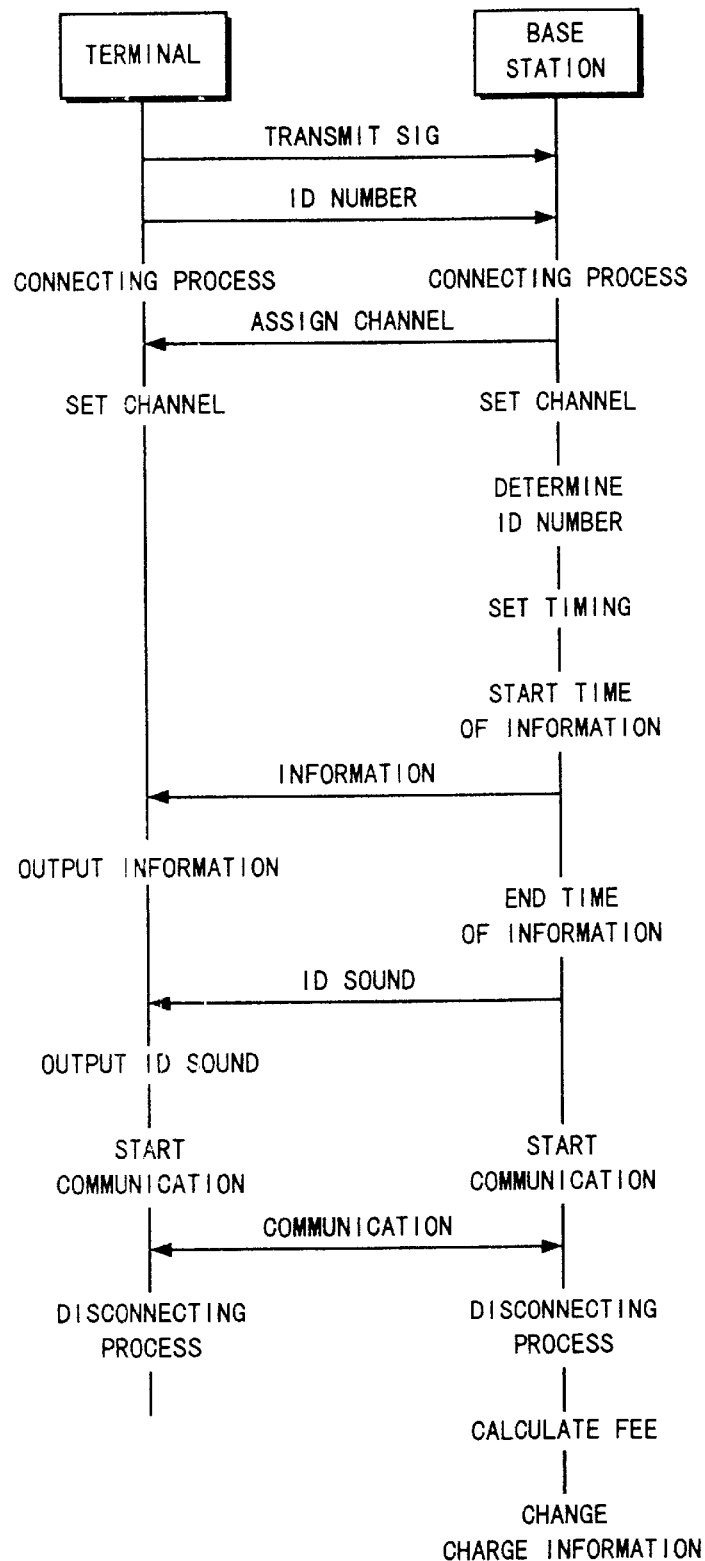
FIG. 7 is a flow chart for explaining an example of the system according to the present invention.

FIG. 7 is a schematic diagram showing the operational procedure performed between the radio base station and the portable telephone terminal that is described above. When the portable telephone terminal makes a call, the portable telephone terminal transmits a call origination signal and an ID number to the radio base station. The radio base station receives the call origination signal and the ID number from the portable telephone terminal. After the radio base station has received the call origination signal from the portable telephone terminal, the radio base station performs a connecting process. In addition, the radio base station assigns an audio signal channel to the portable telephone terminal. When the portable telephone terminal has assigned the audio signal channel, it sets the assigned audio signal channel.

With reference to the received ID number and the registered ID number, the radio base station determines whether or not the portable telephone terminal can accept the receiving of the information. When the received ID number has been registered, the radio base station determines that the portable telephone terminal can accept the receiving of the information and sets the transmission start time of the information. The radio base station starts outputting the information stored in the storing portion 17 at the transmission start time that has been set and transmits the information to the portable telephone terminal.

The portable telephone terminal receives the information from the radio base station. The received information is supplied to the audio signal processing circuit 52. The audio signal processing circuit 52 converts the information into an audio signal and outputs the audio signal from the speaker 59. After the radio base station has completely transmitted the information, it transmits a signal that represents an ID sound to the portable telephone terminal. The portable telephone terminal receives the signal of the ID sound. With the ID sound, the user of the portable telephone terminal knows of the completion of the transmission of the information. After the radio base station has completely transmitted the information, a normal communication is performed between the radio base station and the portable telephone terminal.

After the communication has been completed, the portable telephone terminal performs a disconnecting process. In addition, the radio base station calculates the communication fee. Depending on whether or not the portable telephone terminal has received the information, the radio base station changes the charge information.

In the above-described example, information is transmitted as audio information. However, information may be transmitted as text and/or graphic information. In this case, the radio base station modulates text and/or graphic information to be transmitted. The controlling circuit 51 of the portable telephone terminal demodulates the text and/or graphic information and outputs the resultant information to for example the display 56.

Thus, in the above-described example, when the portable telephone terminal makes a call, the radio base station determines whether or not the ID number of the portable telephone terminal accords with an ID number registered therein. When they accord, the radio base station transmits information to the portable telephone terminal. In this example, when the user of the portable telephone terminal hears the information, he or she should make a call. Thus, the user cannot hear the information at anytime. However, as shown in FIG. 8, when the portable telephone terminal has a memory 64, an information storage switch 62A, an information output switch 62B, and a timing determining circuit 63, the user can hear the information when necessary.

Figure 8:
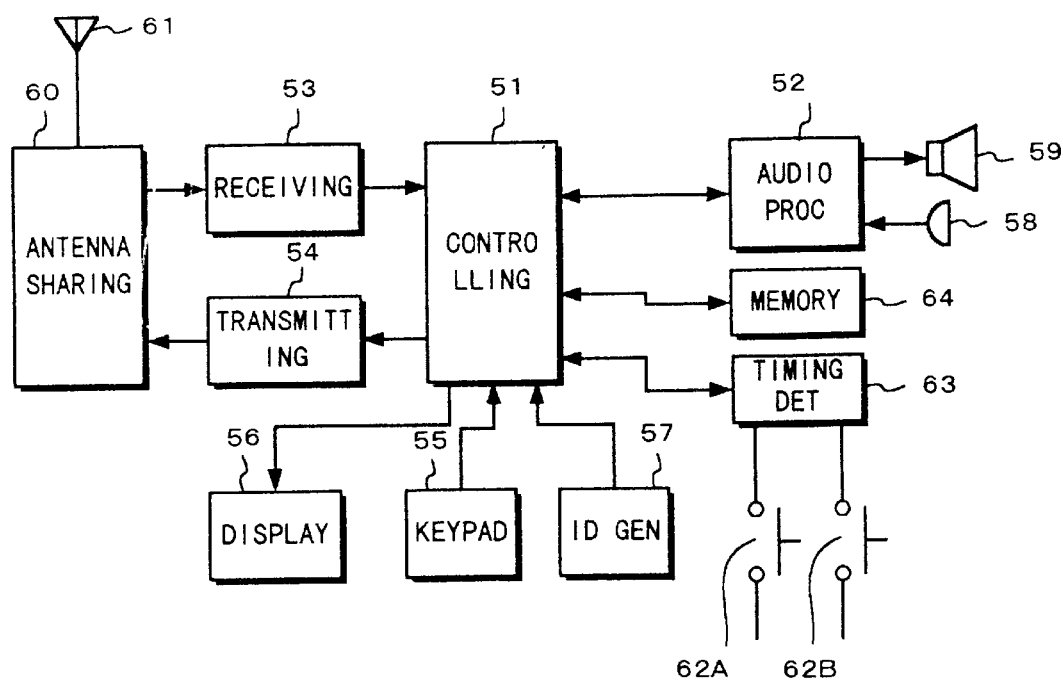
FIG. 8 is a block diagram showing another example of the portable telephone terminal of the system according to the present invention.

In other words, referring to FIG. 8, output signals of the information storage switch 62A and the information output switch 62B are supplied to the timing determining circuit 63. When the user operates the information storage switch 62A, at the timing that has been set by the timing determining circuit 63, the controlling circuit 51 outputs a message for causing the radio base station to transmit information. This message is transmitted from the antenna 61 through the transmitting circuit 54 and the antenna sharing unit 60. When the radio base station has received the signal, it transmits the information to the portable telephone terminal. The information is received by the antenna 61. The received information is supplied to the receiving circuit 53 through the antenna sharing unit 60. The information is stored in the memory 64 under the control of the controlling circuit 51. When the user operates the information output switch 62B, the information stored in the memory 64 is output from the speaker 59 through the audio signal processing circuit 52.

Figure 9:
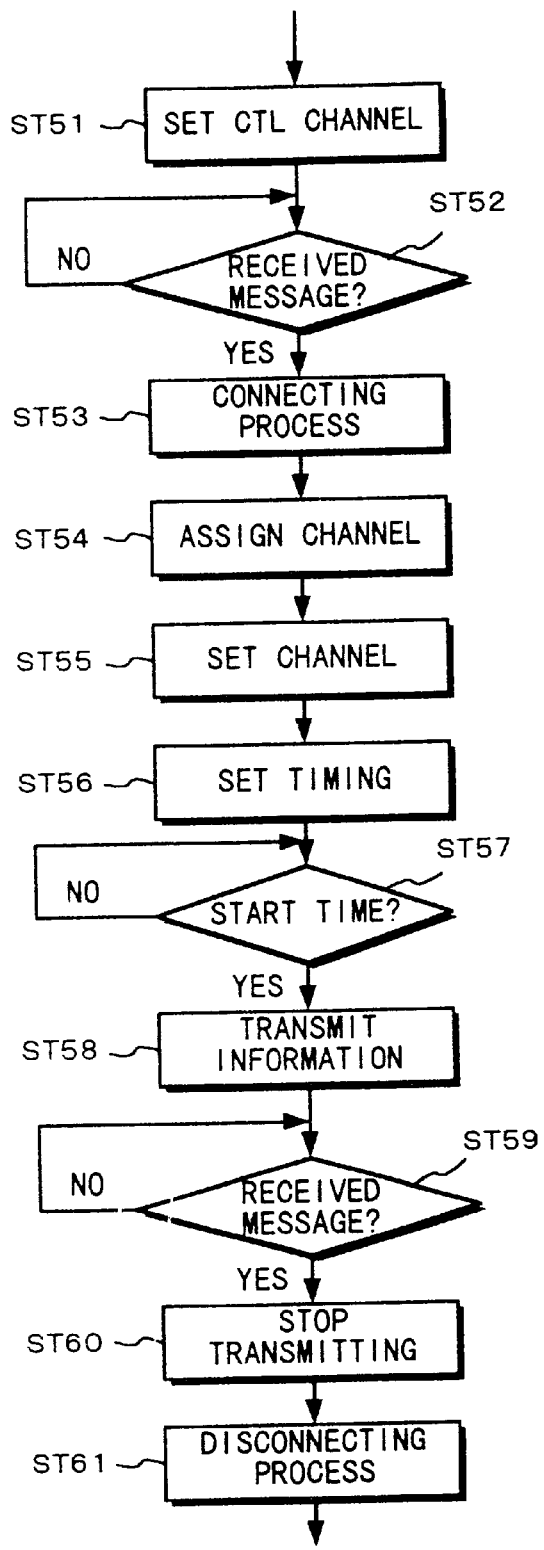
FIG. 9 is a flow chart for explaining another example of the radio base station of the system according to the present invention.

FIG. 9 is a flow chart showing the operation of the radio base station in the case that the structure shown in FIG. 8 is used. The radio base station sets a control signal channel (at step ST51). The radio base station determines whether a message for requesting information has been received (at step ST52). When the determined result at step ST52 is YES, the radio base station performs a connecting process (at step ST53). After the radio base station has completed the connecting process, it assigns an audio signal channel and sends a signal that represents the assigned audio signal channel to the portable telephone terminal (at step ST54). Thereafter, the radio base station sets the audio signal channel (at step ST55). The radio base station sets the transmission start time and the transmission end time of information (at step ST56).

The radio base station determines whether or not the transmission start time took place (at step ST57). When the determined result at step ST57 is YES, the radio base station transmits the information stored in the storing portion 17 to the portable telephone terminal (at step ST58). Thereafter, the radio base station determines whether or not it has received an information transmission stop message from the portable telephone terminal (at step ST59). When the determined result at step S59 is YES, the radio base station stops transmitting the information to the portable telephone terminal (at step ST60). Thereafter, the radio base station performs a disconnecting process (at step ST61).

Figure 10A:
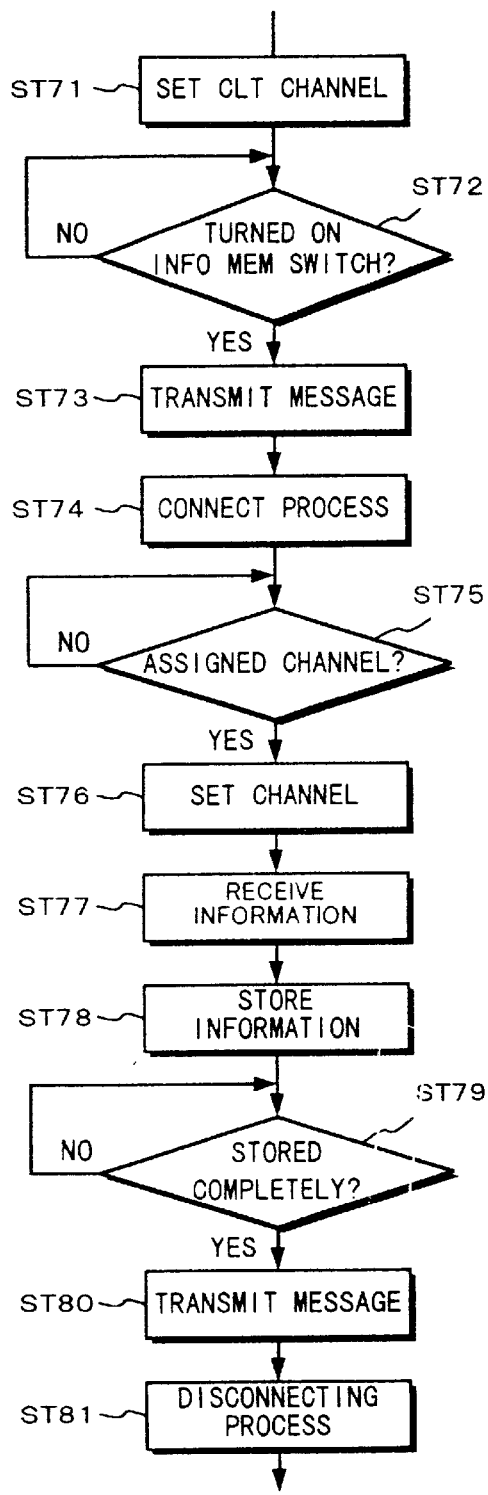
FIGS. 10A and 10B are flow charts for explaining another example of the portable telephone terminal of the system according to the present invention.
Figure 10B:
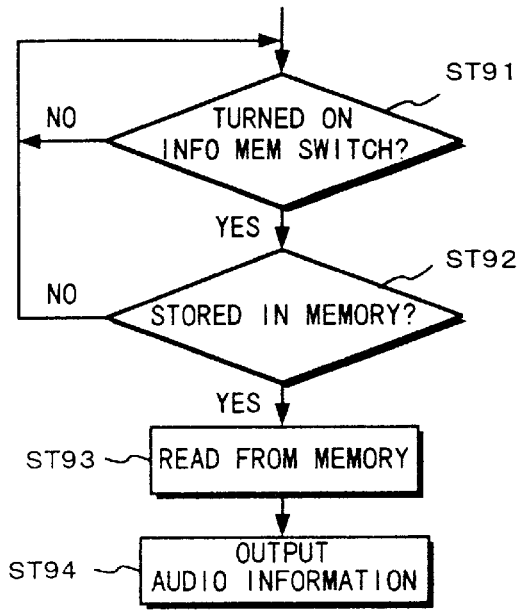

FIGS. 10A and 10B are flow charts showing the operation of the portable telephone terminal in the case that the structure shown in FIG. 8 is used. In FIG. 10A, when the portable telephone terminal is in the normal waiting state, it sets a control signal channel (at step ST71). The portable telephone terminal determines whether or not the information storage switch 62A has been pressed (at step ST72). When the determined result at step ST72 is YES, the portable telephone terminal transmits a message for requesting information to the radio base station (at step ST73). Thereafter, the portable telephone terminal performs a connecting process (at step ST74). After the portable telephone terminal has completed the connecting process, the radio base station assigns an audio signal channel to the portable telephone terminal. The portable telephone terminal determines whether or not the audio signal channel has been assigned (at step ST75). When the determined result at step ST75 is YES, the portable telephone terminal sets the audio signal channel (at step ST76).

When the portable telephone terminal has set the audio signal channel, the radio base station transmits regional information as audio information to the portable telephone terminal. The portable telephone terminal receives the information (at step ST77) and stores it in the memory 64 (at step ST78). The portable telephone terminal determines whether or not the information has been stored in the memory 64 (at step ST79). When the determined result at step ST79 is YES, the portable telephone terminal transmits an information transmission stop message to the radio base station (at step ST80). Thereafter, the portable telephone terminal performs a disconnecting process (at step ST81).

With such a process sequence, the information is stored in the memory 64. When the user of the portable telephone terminal operates the information output switch 62B, the information is output from the memory 64. In other words, as shown in FIG. 10B, the portable telephone terminal determines whether or not the information output switch 62B has been pressed (at step ST91). When the determined result at step ST91 is YES, the portable telephone terminal determines whether or not the information has been stored in the memory 64 (at step ST92). When the determined result at step ST92 is YES, the portable telephone terminal reads the information from the memory 64 (at step ST93). The audio signal processing circuit 52 converts the information into a sound signal and outputs the sound signal from the speaker 59 (at step ST94).

Figure 11:
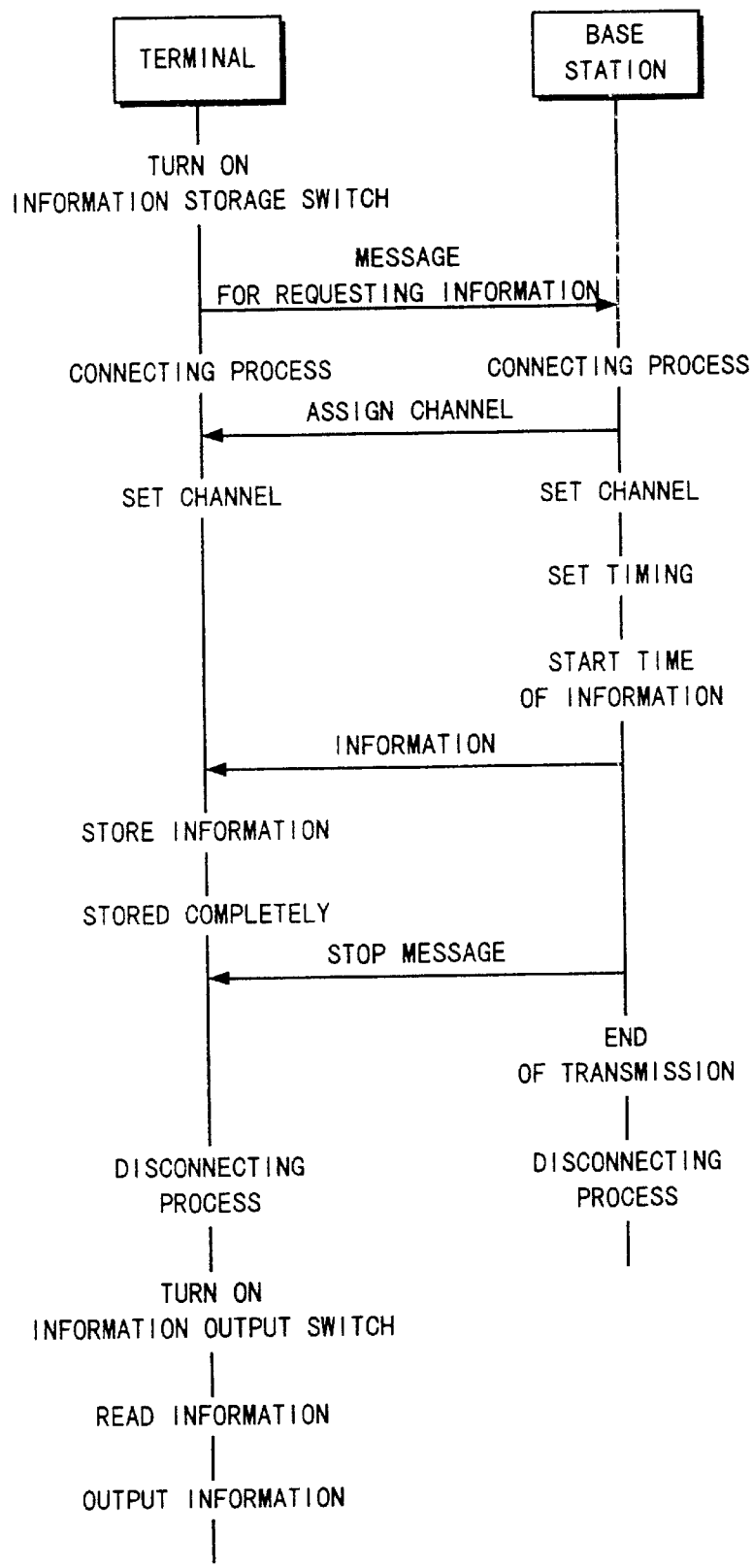
FIG. 11 is a flow chart for explaining another example of the system according to the present invention.

FIG. 11 is a schematic diagram showing the operational procedure in the case that the structure shown in FIG. 8 is used. When the user of the portable telephone terminal operates the information storage switch 62A, the controlling circuit 51 outputs a message for requesting information to the radio base station. This message is transmitted to the radio base station through a control signal channel.

The radio base station receives the message from the portable telephone terminal. When the radio base station has received the message, it performs a call originating process so as to assign an audio signal channel to the portable telephone terminal. When the portable telephone terminal has been assigned the audio signal channel, it sets the assigned audio signal channel. The radio base station sets the transmission start time and the transmission end time of information. The radio base station starts transmitting the information at the transmission start time that has been set.

The portable telephone terminal receives the information from the radio base station. The received information is stored in the memory 64. The portable telephone terminal determines whether or not the information has been stored in the memory 64. When the information has been stored in the memory 64, the portable telephone terminal transmits an information transmission stop message to the radio base station.

When the radio base station has received the message, it stops transmitting the information to the portable telephone terminal. Thereafter, the radio base station performs a disconnecting process. When the user operates the information output switch 62B, the portable telephone terminal reads the information from the memory 64 and supplies the information to the audio signal processing circuit 52. The audio signal processing circuit 52 converts the information into a sound signal and outputs it from the speaker 59.

The information transmitted from the radio base station to the portable telephone terminal may be text and/or graphic information. In this case, along with audio information that is output from the speaker 59, text and/or graphic information is output to the display 56.

In the above-described examples, information is unidirectionally transmitted from the radio base station to the portable telephone terminal. Instead, a reply of information transmitted from the radio base station to the portable telephone terminal may be sent back to the radio base station. This structure may be used when the user of the portable telephone terminal sends back a reply of shopping information to the radio base station.

Now, assume that shopping information has been stored in the memory 64 and that the user of the portable telephone terminal transmits a reply of information to the radio base station so as to purchase a desired commodity.

Figure 12:
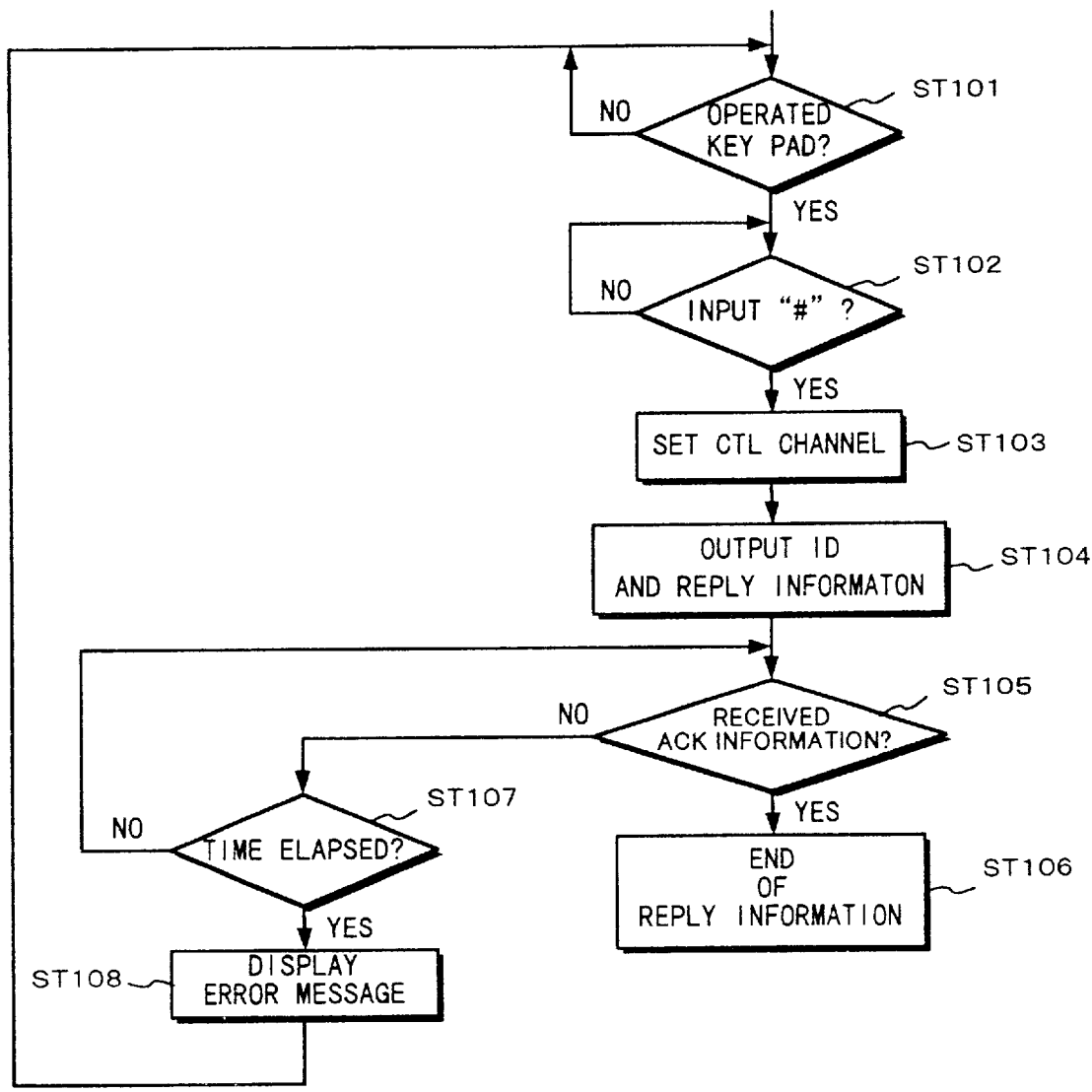
FIG. 12 is a flow chart for explaining a further example of the portable telephone terminal of the system according to the present invention.

In this case, the portable telephone terminal performs a process sequence as shown in FIG. 12. The user of the portable telephone terminal operates a proper key of the key pad (at step ST101). When the user presses for example the "#" key (at step ST102), the portable telephone terminal sets a control signal channel (at step ST103). The portable telephone terminal transmits reply information corresponding to the key that the user has pressed and the ID number of the portable telephone terminal (at step ST104). When the portable telephone terminal has transmitted the reply information and the ID number to the radio base station, it sends back an acknowledgment message to the portable telephone terminal. The portable telephone terminal determines whether or not the acknowledgment message has been received (at step ST105). When the determined result at step ST105 is YES, the portable telephone terminal has completely transmitted the reply information (at step ST106). When the determined result at step ST105 is NO, the portable telephone terminal determines whether or not a predetermine time period has elapsed (at step ST107). When the determined result at step ST107 is YES, the portable telephone terminal displays an error message (at step ST108). Thereafter, the flow returns to step ST101.

Figure 13:
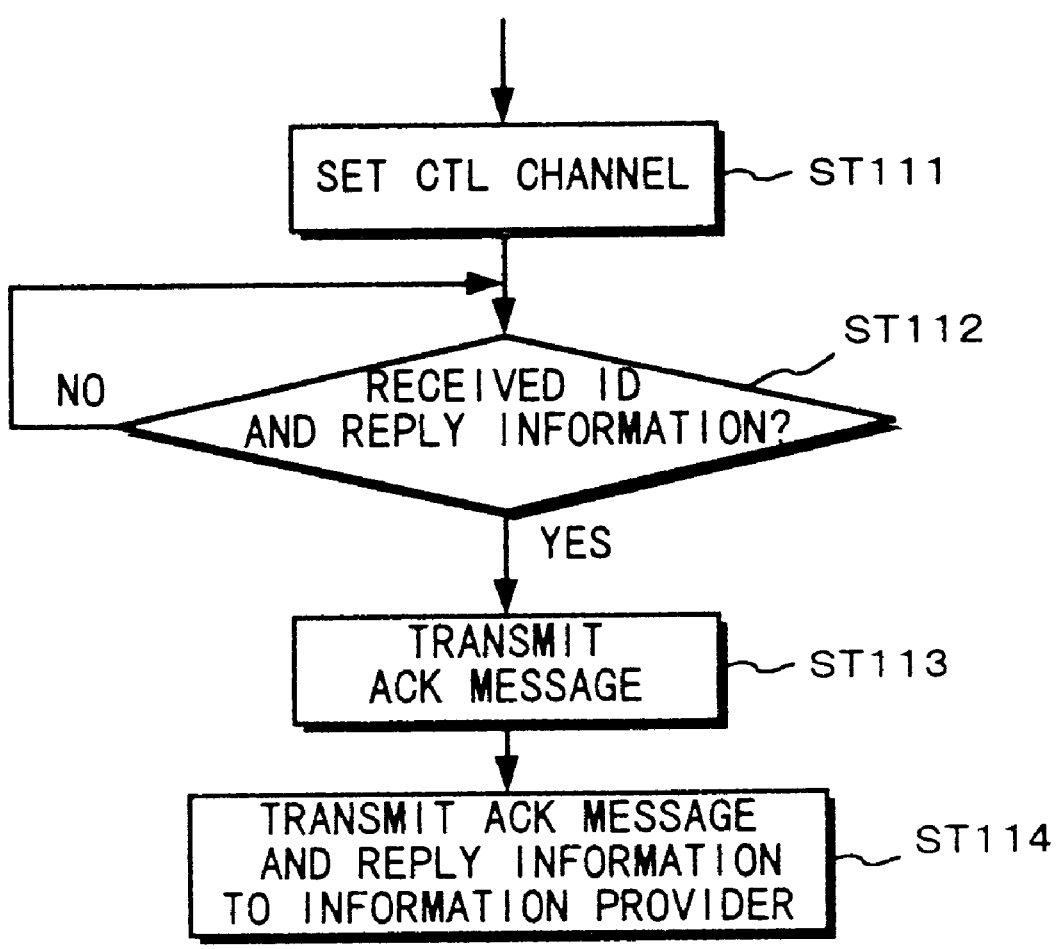
FIG. 13 is a flow chart for explaining a further example of the radio base station of the system according to the present invention.

The radio base station performs a process sequence as shown in FIG. 13. The radio base station sets a control signal channel (at step ST111). The radio base station determines whether or not replay information and an ID signal have been received (at step ST112). When the determined result at step ST112 is YES, the radio base station transmits an acknowledgment message to the portable telephone terminal (at step ST113). The reply information and the ID number are transmitted to the information provider (at step ST114). When the information provider is a store, it can know the name and address of the customer corresponding to the ID number and identifies the commodity that the customer has ordered corresponding to the reply information.

Figure 14:
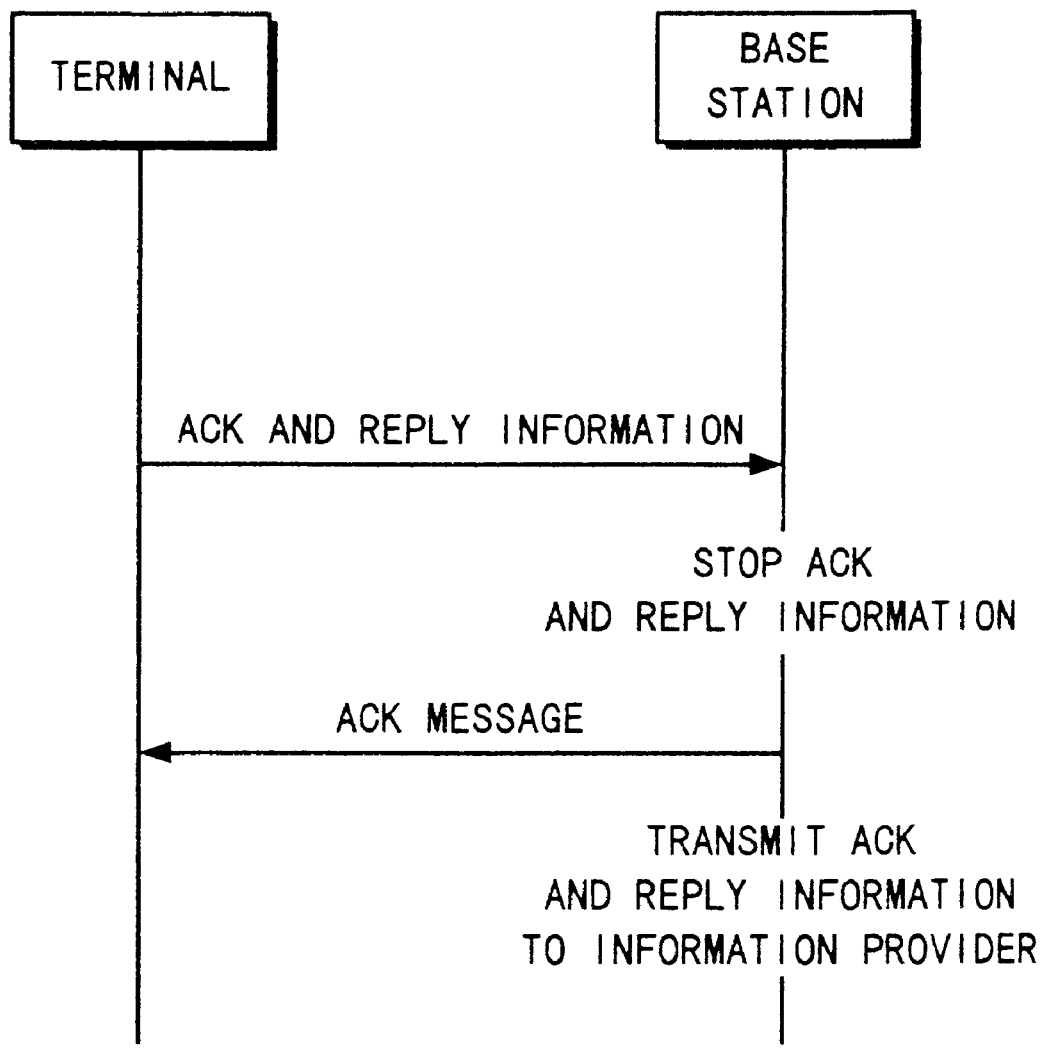
FIG. 14 is a flow chart for explaining a further example of the system according to the present invention.

FIG. 14 is a schematic diagram showing an operational procedure in the case shown in FIG. 13. The portable telephone terminal transmits the ID number and reply information to the radio base station. When the radio base station has received the ID number and the reply information, it stores them and sends back an acknowledgment message to the portable telephone terminal. The portable telephone terminal receives an acknowledgment message and determines that the reply information has been transmitted to the radio base station. The radio base station transmits the ID number and reply information to the information provider.

According to the present invention, regional information such as disaster information, advertisement information, and shopping information is stored as audio information in a radio base station. When a portable telephone terminal communicates with the radio base station, it transmits the information to the portable telephone terminal. In a cellular system, since radio base stations are disposed at intervals of several kilometers, each cell can be treated as a regional unit of an information provider. When regional information is stored in the radio base stations, regional information can be promptly obtained.

Although the present invention has been shown and described with respect to best mode embodiments thereof, it should be understood by those skilled in the art that the foregoing and various other changes, omissions, and additions in the form and detail thereof may be made therein without departing from the spirit and scope of the present invention.

What is claimed is:

1. A telecommunication system comprising:

a plurality of radio base stations for performing telecommunication, wherein each of said plurality of radio base stations is disposed in a respective one of a plurality of cells formed by dividing a telecommunication service area; and a plurality of portable radio telecommunication units such that a portable radio telecommunication unit positioned in one of said plurality of cells performs said telecommunication using a radio base station disposed in said one of said plurality of cells, wherein a user of said portable radio telecommunication unit positioned in said one of said plurality of cells transmits identification information during origination of a call and said radio base station disposed in said one of said plurality of cells transmits predetermined information to said portable radio telecommunication unit when said identification information corresponds to predetermined identification information, wherein said predetermined information includes text information and/or graphic information, and said radio base station includes means for determining a reduced communication fee associated with said predetermined information when said predetermined information includes advertisement information, said reduced communication fee being reduced from a user fee of said portable radio telecommunication unit when said predetermined information is transmitted to said portable radio telecommunication unit, wherein said advertisement information is continuously and automatically outputted during connection of said portable radio telecommunication unit and said reduced communication fee is calculated upon disconnection of said portable radio telecommunication unit.

2. The telecommunication system as set forth in claim 1, wherein said portable radio telecommunication unit transmits reply information in response to said predetermined information transmitted by said radio base station.

3. The telecommunication system as set forth in claim 2, wherein said predetermined information includes commodity information, and said reply information includes order information corresponding to said commodity information.

4. The telecommunication system as set forth in claim 1, wherein said predetermined information includes audio information.

5. The telecommunication system as set forth in claim 1, wherein said predetermined information includes regional information associated with said cell.

6. A radio base station for a telecommunication system having a plurality of radio base stations each disposed in a respective one of a plurality of cells formed by dividing a telecommunication service area and a plurality of portable radio telecommunication units at least one of which is located in at least one of said plurality of cells for performing telecommunication via said plurality of radio base stations respectively disposed in said plurality of cells, said radio base station comprising:

transmitting and receiving means for transmitting predetermined information to a portable radio telecommunication unit and for receiving identification information from said portable radio telecommunication unit, wherein said predetermined information includes text information and/or graphic information, and;

storing means for storing said predetermined information;

decision means for determining whether said received identification information corresponds to predetermined identification information;

control means for controlling transmission of said predetermined information via said transmitting and receiving means when said decision means determines that said identification information received by said transmission and receiving means corresponds to said predetermined identification information; and means for determining a reduced communication fee associated with said predetermined information when said predetermined information includes advertisement information, said reduced communication fee being reduced from a user fee of said portable radio telecommunication unit when said predetermined information is transmitted to said portable radio telecommunication unit;

wherein said advertisement information is continuously and automatically outputted during connection of said portable radio telecommunication unit and said reduced communication fee is calculated upon disconnection of said portable radio telecommunication unit.

7. The radio base station as set forth in claim 6, wherein said predetermined information includes audio information.

8. The radio base station as set forth in claim 6, wherein said predetermined information includes regional information associated with a cell in which said radio base station is located.

\* \* \* \* \*